United States Patent [19]

Hirasuna

[11] 4,244,908

[45] Jan. 13, 1981

[54] CURE-IN-PLACE PROCESS FOR SEALS

[75] Inventor: Alan R. Hirasuna, Corona Del Mar, Calif.

[73] Assignee: The United States of America as represented by the United States Department of Energy, Washington, D.C.

[21] Appl. No.: 22,896

[22] Filed: Mar. 22, 1979

[51] Int. Cl.$^3$ .................. B29C 25/00; B29H 5/01; E21B 33/10

[52] U.S. Cl. .................. 264/236; 175/371; 264/259; 264/347; 264/DIG. 67

[58] Field of Search ............ 264/236, 347, DIG. 67, 264/259, 248; 175/371

[56] References Cited

U.S. PATENT DOCUMENTS

| | | | |
|---|---|---|---|
| 9,668 | 4/1853 | Goodyear et al. ............ 264/347 X |
| 1,188,078 | 6/1916 | Jones ............................ 264/347 X |
| 2,473,284 | 6/1949 | Knaggs ........................ 264/DIG. 67 |
| 2,646,595 | 7/1953 | Leistensnider ............ 264/DIG. 67 |
| 2,682,082 | 6/1954 | Gehman et al. ............ 264/347 X |
| 2,717,025 | 9/1955 | Jelinek ........................ 264/DIG. 67 |
| 2,717,793 | 9/1955 | Nenzell ........................ 264/273 X |
| 2,995,057 | 8/1961 | Nenzell ........................ 264/DIG. 67 |
| 3,004,298 | 10/1961 | Haynie ........................ 264/DIG. 67 |
| 3,122,353 | 2/1964 | Killian ........................ 264/259 X |
| 3,191,277 | 6/1965 | Glasgow ...................... 264/259 X |
| 3,264,393 | 8/1966 | Merrill ........................ 264/236 |
| 3,493,645 | 2/1970 | Sanderson et al. ............ 264/248 X |
| 3,714,318 | 1/1973 | Charewicz et al. ............ 264/236 |
| 3,733,155 | 5/1973 | Burke ........................ 264/DIG. 67 |
| 3,929,729 | 12/1975 | Chung ........................ 264/236 X |
| 3,969,451 | 7/1976 | Floyd et al. ................ 264/236 X |

FOREIGN PATENT DOCUMENTS 871341  6/1961  United Kingdom .............. 264/236

*Primary Examiner*—Philip Anderson
*Attorney, Agent, or Firm*—James E. Denny; Roger S. Gaither; L. E. Carnahan

[57] ABSTRACT

A cure-in-place process which allows a rubber seal element to be deformed to its service configuration before it is cross-linked and, hence, is a plastic and does not build up internal stress as a result of the deformation. This provides maximum residual strength to resist the differential pressure. Furthermore, the process allows use of high modulus formulations of the rubber seal element which would otherwise crack if cured and then deformed to its service configuration, resulting in a seal which has better gap bridging capability. Basically, the process involves positioning an uncured seal element in place, deforming it to its service configuration, heating the seal element, curing it in place, and then fully seating the seal.

9 Claims, No Drawings

CURE-IN-PLACE PROCESS FOR SEALS

BACKGROUND OF THE INVENTION

The invention described herein was made in the course of, or under, Contract No. EG-77-C-03-1308 with the United States Department of Energy.

The invention relates to seals for high temperature, downhole applications, particularly to improved elastomers for high temperature seals, and more particularly to a cure-in-place process for such seals which reduces failure of such from extrusion by enabling high modulus compounds heretofore impractical to be employed.

Seal materials are most commonly made from elastomers because they are the most practical seal material. They are economical, relatively very inexpensive, except for a minority made from exotic polymers, and are reusable, except for very severe environments. They are very reliable and forgiving with respect to installation and manufacturing tolerances of the mating parts to be sealed. Because of the forgiving nature of elastomeric seals, they can be successfully installed by unskilled persons and they can be installed in field environments. Elastomers have the added advantage of flowing and conforming to irregularities while providing elastomeric resistance to continued flow after seating.

High temperature downhole seals tend to fail from extrusion and hardening. In geothermal wells, for example, having temperatures of 260° C. (500° F.) and higher, it is not unusual to have compositions of the fluid which are unusually reactive to elastomeric compounds.

260° C. causes most rubber compounds to harden by thermal breaking of double bonds and forming new cross-links to form a three dimensional matrix with less and less ability to yield and recover when deformed. This action proceeds quite rapidly in air (oxygen). In water or steam at high temperatures, the hot water acts as an active swelling and softening agent, sufficient to break crosslinkages causing most cured elastomers to devulcanize or revert and to become soft and weak. The geothermal well fluid often contains sulfur in the form of hydrogen sulfide. At high temperatures sulfur rapidly breaks double bonds and forms cross-links until the rubber becomes hard and brittle. This fluid also can contain considerable concentrations of metallic salts completely ionized. The effects of such salts on elastomeric compounds is not currently known.

Thus, the geothermal environment imposes extraordinary requirements on the seal elements due to the temperature and chemistry thereof which substantially reduce the elastomeric seals' ability to withstand the significant internal stresses which are generated in the rubber as the seal is compressed endwise to cause it to expand circumferentially and seat against its OD and ID. Because of the severe and complex nature of the materials and structural requirements for the seals used in high temperature downhole applications, such as geothermal or oil drilling applications, efforts are underway to develop elastomers for the downhole geothermal seal application, as well as effective methods and means for placing the seals in their service location and configuration.

Various elastomers, reinforcing fillers and curing systems have been evaluated for high temperature, downhole applications. The most common and lowest cost elastomers are the butadiene copolymers. These elastomers are copolymers of butadiene and styrene or butadiene and acrylonitrile (the latter is used in nearly all oil well seals because of its resistance to degradation by crude oil). These polymers have unsaturated backbone structure —C=C—C—C=C etc., the double bond being used to get fast curing with sulfur. Unfortunately, only a few of the double bonds are used to form the sulfur cross-linkages; consequently, sulfur in the geothermal fluid continues to break those remaining double bonds to form more sulfur cross-links until the seal compound becomes very hard and weak, crumbling or cracking during use. Thus, for geothermal seal applications, elastomers free of excess double bonds in the backbone must be utilized.

The elastomers free of excess double bonds which have been recently evaluated for high temperature downhole applications, particularly geothermal, include butyl rubber, epichlorohydrin polymers, polyacrylics, chloroprene elastomers, ethylene propylene diene terpolymers, silicone elastomers, and fluoroelastomers (Viton, Fluorels). Of these, the most promising were the fluoroelastomers which fluorinated hydrocarbons with completely saturated —C—C backbone to give the best resistance to heat, oxidation and attack by sulfur. Of the fluoroelastomers, peroxide cured Vitons were selected for compounding, evaluation of cure systems and reinforcing fillers because of their good prospects in steam and fluids environments. Various tests conducted on the selected elastomers are set forth in report SAN/1308-1 entitled "Geothermal Elastomeric Materials" prepared by L'Garde, Inc. under the above-referenced contract.

The results of the tests, set forth in the above-identified report, illustrated a need to eliminate excessive stresses which cause seal failure induced when the seal is deformed and seated.

Also, it is has heretofore been impractical to employ high modulus compounds as seals in applications such as packers because they must be significantly reshaped when sealed off which cause them to crack when sealing off is attempted.

SUMMARY OF THE INVENTION

The cure-in-place process of the present invention fills the above-described need by eliminating stresses induced when the seal is deformed and seated. The invention is based on the seal being plastically deformed rather than elastomerically deformed when it is seated whereby the internal stresses relative thereto would not be generated in the seal material, and thereafter curing the seal in place. Through the use of uncured seals which are reshaped into service configuration and then cured, very high modulus (when cured) extrusion resistent compounds can be used as seals.

Basically, the process of this invention involves the operational steps of positioning, in place, an elastomeric seal in an uncured or partially cured state, deforming the seal to its service configuration, heating the thus deformed seal, curing the seal in place, and then fully seating the seal.

The cure-in-place process of this invention allows the seal to be deformed to its service configuration before it is cross-linked, is in a plastic state, and does not build up internal stress as a result of the deformation. This provides maximum residual strength to resist the differential pressure and allows for use of high modulus formulations of the seal material which would otherwise crack if cured and then deformed. Thus, the invention also provides a seal which has better gap bridging capability.

Therefore, it is an object of the invention to provide a process which results in a high temperature seal having maximum residual strength and gap bridging capability without buildup of internal stress resulting from deformation of the seal while positioning it in its service configuration.

A further object of the invention is to provide a process which results in improved utilization of elastomeric seals in high temperature, downhole applications.

Another object of the invention is to provide a seal emplacement process wherein the seal is deformed to it's service configuration in an uncured or partially cured state, and cured in it's service configuration, thus eliminating internal stress caused by deformation.

Another object of the invention is to provide a process for seal implacement wherein the seal material is plastically deformed to it's service configuration, cured in place, and then fully seated.

Other objects of the invention will become readily apparent from the following description.

DETAILED DESCRIPTION OF THE INVENTION

The invention is a cure-in-place process for rubber (elastomeric) seals which eliminates internal stress in the seal material caused by elastomeric deformation. The process is particularly applicable for seals utilized in high temperature, downhole applications, such as in geothermal well or enhanced oil recovery operations. Utilization of the process of the invention provides seals having maximum residual strength and better gap bridging capability since such allows for the use of high modulus formulations of the seal material.

High temperatures, such as 260° C. (500° F.), found in geothermal wells and the composition of the fluid therein causes rapid breakdown of elastomeric seal material which is cured prior to deformation into its service configuration, as pointed out above. It has been found that the excessive stresses, induced when the seal is deformed and seated, which cause the seal failure, can be eliminated if the seal material is plastically deformed as opposed to being elastomerically deformed when it is seated. Thus, by partially seating, but fully deforming the seals in their uncured or partially cured state, curing them in place, and then fully seating the seals provides an increase in the potential of the elastomeric seals for high temperature, downhole operation.

While the following description of the equipment, elastomer formulation, seal molding, and the cure-in-place process is directed to geothermal well casing seals and/or laboratory feasibility tests and materials utilized to verify the process of the invention, such is not intended to limit the cure-in-place process to any specific type of seal material or application thereof. The casing packer seal element described hereinafter has a specific elastomer formulation for a specific application (geothermal wells at 260° C.), and depending on the application and the elastomer formation, many of the details of the seal molding technique described hereinafter will change. For example, ethylene propylene diene terpolymers (EPDMs) may be utilized instead of the peroxide cured Vitons. However, the invention lies in the cure-in-place process and the essence of the process is very basic. Once the uncured seal element is in place, it is caused or allowed to heat up and is then deformed to its service configuration, whereafter it is cured-in-place, seated, and then the seal undergoes normal operation.

To verify the invention, the following equipment, elastomer formulation, and seal molding technique were utilized:

EQUIPMENT (1) Cure press—50 ton, 350° F. min., 12.5×12.5 inch platens.
(2) Compression mold—3.75" OD packer seal element for 4.0" ID casing.
(3) Laboratory simulation test device or actual packer.

| Elastomer Formulation | |
|---|---|
| VT-R-4590 (Viton): | |
| (a fluorinated hydrocarbon) | 100 phr |
| Austin Black: (bituminous coal fines) | 10 phr |
| Statex M568: (FEF-HS black, N568) | 55 phr |
| Maglite K: (MgO) | 2 phr |
| Diak #7: (Triallylisocyanurate) | 3 phr |
| Luperco 130XL: (diperoxide) | 1.5 phr |

SEAL MOLDING (1) Bring mold and press to steady state of 200° F., or to a temperature which enables good flow of the elastomer in the mold, but low enough that significant crosslinking does not occur.
(2) Insert elastomer (rubber) in mold and bring force to 50 tons.
(3) Turn off heater power to mold and press.
(4) Maintain force at 50 tons for 3.5 hrs.
(5) Remove molded seal 3.5 hrs. after initial insertion of elastomer.

With an uncured elastomeric (rubber) seal formulated and molded as above described, the cure-in-place process of this invention is carried out, for example, as follows:

(1) Insert molded seal element into casing packer or simulator device. The packer may be of either the inflatable type or mechanical squeeze type, for example.
(2) Seal ends of molded seal element with RTV-106 silicone rubber or equivalent.
(3) Immerse in a brine or well fluid.
(4) Compress the seal element, while immersed, 120 mils to deform it to its service configuration.
(5) Apply heat and set for 500° F.
(6) Allow seal to cure at temperature for 24 hours from initiation of heat-up.
(7) Set cured seal by compressing it further to its seated position.

The heat applied during the process may, for example, be provided from the geothermal well or from steam used in the enhanced oil recovery process. In the geothermal application means are necessary to maintain the elastomer at lower temperatures until the seal is set into its sealed configuration and cross-linking is desired. For enhanced oil recovery, the packer containing the molded seal element can be partially set in a cold hole and steam circulated down to the packer to heat up, maintain temperature, and cure the seal. Once the seal is cured, the packer can be fully set in the hole and then placed in operation.

Several modifications of the process may relate to timing, preventing the curing until the seal is fully seated, green strength of the elastomer, etc. One way to forestall curing, for example, is through creative system design, the use of cryogenic cooling systems to keep the seal from heating up until after it is partially seated, etc.

It has thus been shown that the present invention provides a cure-in-place process which allows an elastomeric seal to be deformed to its service configuration prior to curing; being in its thus plastic state the material does not build up internal stress as a result of the deformation. This provides maximum residual strength to resist differential pressure and allows for use of high modulus formulations which results in better gap bridging capability.

While particular parameters and materials have been described for carrying out the invention, modifications and changes will become apparent to those skilled in the art, and it is intended to cover in the appended claims all modifications and changes that come within the spirit and scope of the invention.

What I claim is:

1. A cure-in-place process for elastomeric seal elements which eliminates stress induced when seal elements are elastomerically deformed and sealed, comprising the steps of: positioning in place a previously formed uncured elastomeric seal element, plastically deforming the uncured seal element to substantially its service configuration, applying heat to the thus deformed uncured seal element for curing the seal element by immersing the deformed uncured seal element in a geothermal well having fluid therein of a temperature of about 500° F.

2. The process defined in claim 1, additionally including the step of fully seating the cured seal element.

3. The process defined in claim 1, wherein the step of applying heat is carried out by heating the seal element to about 500° F.

4. The process defined in claim 1, wherein the step of curing the seal element is carried out over a time period of about twenty-four hours.

5. The process defined in claim 1, additionally including the step of sealing the ends of the seal element prior to the step of deforming the seal element.

6. The process defined in claimed 1, additionally including the step of immersing the seal element in a geothermal well fluid or brine prior to the step of deforming the seal element.

7. The process defined in claim 1, additionally including the step of forming the seal element from an elastomeric material consisting of a fluoroelastomer prior to the step of positioning the seal element.

8. The process defined in claim 7, wherein the step of forming the seal element from a fluoroelastomer is carried out by heating a mold and press to a steady state temperature sufficient to cause good flow of the fluoroelastomer material without causing significant cross-linking thereof to occur, inserting the fluoroelastomer material into the mold, activating the press to apply a force to the mold, maintaining the force for a time period, removing the applied force, and removing the thus formed seal element from the mold.

9. The process defined in claim 8, wherein the mold and press is heated to about 200° F., wherein the force applied is about 50 tons, and wherein the force is maintained for a time period of about 3.5 hours.

* * * * *